May 24, 1932.　　　H. H. BAILEY ET AL　　　1,859,647
APPARATUS FOR CONTROLLING STEAM ENGINES
Filed Feb. 3, 1930　　　3 Sheets-Sheet 1
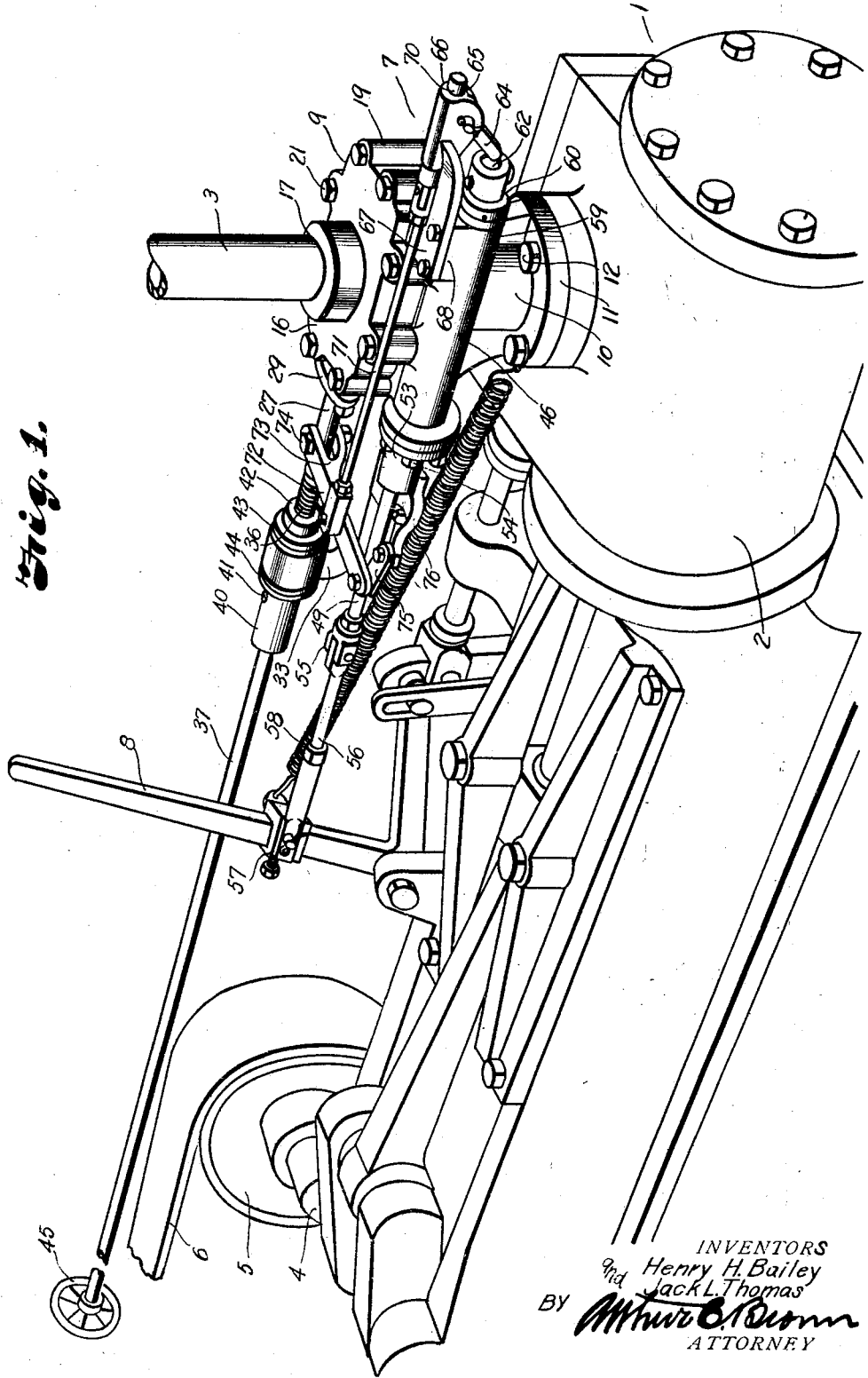
INVENTORS
Henry H. Bailey
Jack L. Thomas
BY Arthur C. Brown
ATTORNEY

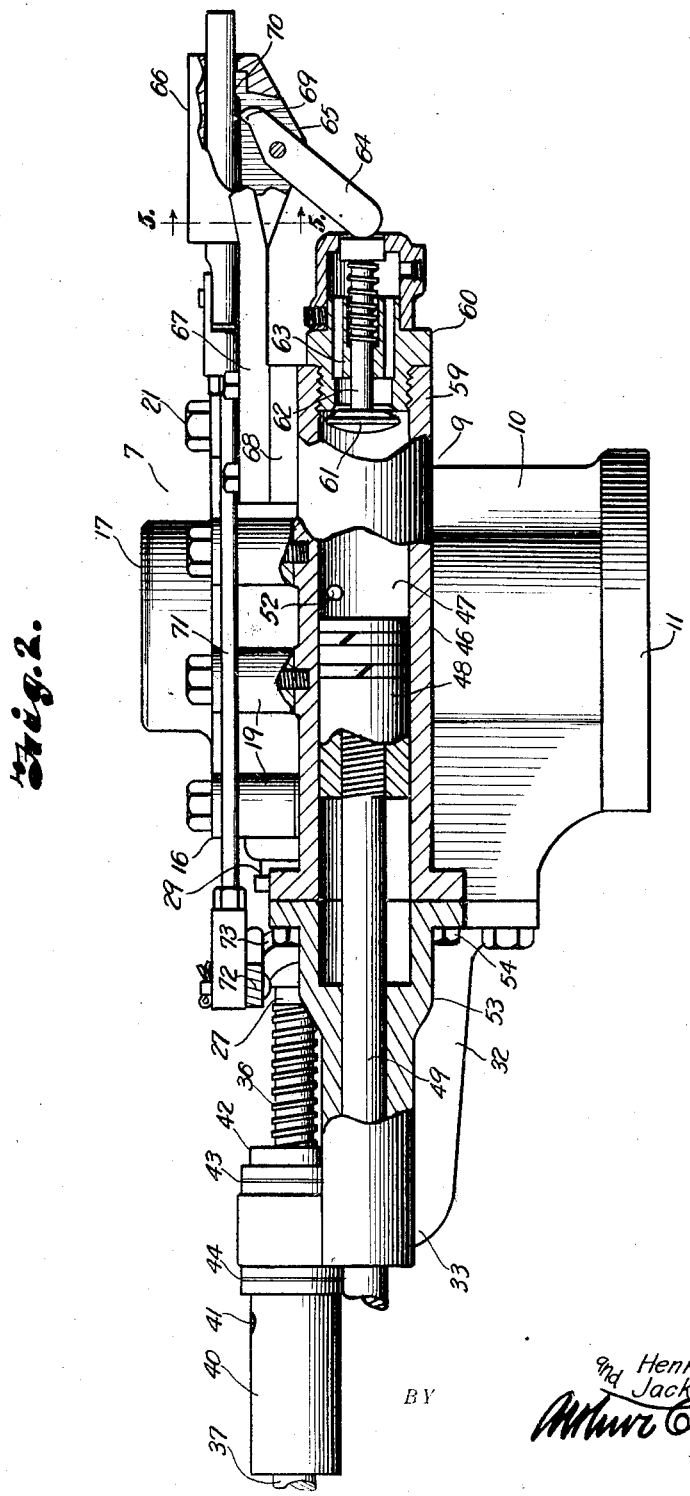

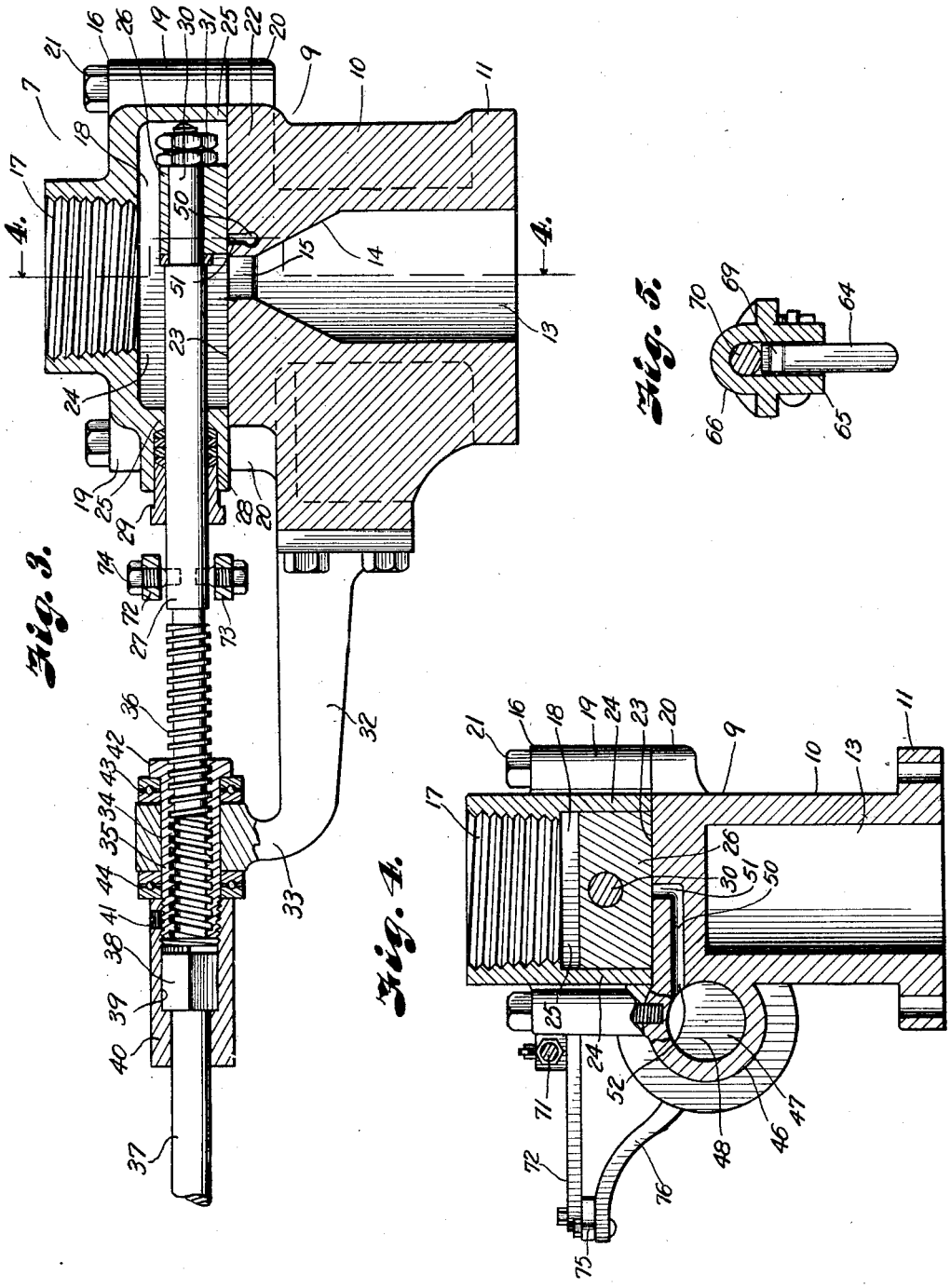

Patented May 24, 1932

1,859,647

UNITED STATES PATENT OFFICE

HENRY H. BAILEY AND JACK LEE THOMAS, OF OKLAHOMA CITY, OKLAHOMA, ASSIGNORS TO MECHANICAL ROYALTIES CORPORATION, OF OKLAHOMA CITY, OKLAHOMA, A CORPORATION OF OKLAHOMA

APPARATUS FOR CONTROLLING STEAM ENGINES

Application filed February 3, 1930. Serial No. 425,470.

Our invention relates to reversing gear for steam engines and more particularly to apparatus auxiliary to the usual manually operable reversing mechanism for effecting reversal of the engine under steam power by an operator stationed at a distance from the engine.

In many instances, such as in well drilling, the driven equipment is located at such distance from the engine that an additional operator must be available to control the engine or a single operator must travel from the equipment to the engine to operate levers by hand for admitting steam to the engine to actuate the same, for shutting off steam, or to operate the normal reversing gear to cause the engine to move in reverse direction and operate the equipment reversely. Manually operated remote control means for shifting gears have been employed but have proved inefficient, because of the distance over which they must operate.

In view of the above described conditions, our invention has for its principal objects to provide remote control for a steam engine and particularly to enable an operator located at a derrick to manipulate the control mechanism of the steam engine whereby the derrick equipment is driven, to employ the steam whereby the invention is actuated to operate the reversing gear and to provide apparatus in which a single controlling member such as a wheel and rod, available to the operator at the derrick, may control the steam supplied to an engine for setting up and maintaining operation of the engine or for reversing the engine.

In accomplishing these and other objects of our invention, we have provided improved details of structure, the preferred forms of which are illustrated in the accompanying drawings, wherein:

Fig. 1 is a perspective view of a steam engine including controlling apparatus embodying our invention.

Fig. 2 is a side elevation of the control mechanism partly broken away for better illustration.

Fig. 3 is a central longitudinal section through the steam control valve casing and valve stem operating members, the stem operating rod being shown fragmentarily.

Fig. 4 is a central section through the valve casing illustrating particularly a by-passing conduit connecting the steam inlet with the control piston chamber.

Fig. 5 is a section on the line 5—5, Fig. 2.

Referring in detail to the drawings:

1 designates generally a steam engine of conventional type including the cylinder 2 having a steam supply line 3, a crank shaft 4, a pulley 5 with its belt 6, and 7 a reversing mechanism including a manually operable lever 8.

Interposed in the steam supply line is a housing 9 including a vertical body member 10 having a lower end flange 11 secured to the cylinder by bolts 12, and provided with an axial bore including a cylindrical channel 13, a tapered portion 14 and a reduced rectangular steam inlet port 15. A cap or cover 16 having a top inlet 17 threaded to receive the steam line is mounted on the body, and recessed to form an elongated valve chamber 18 communicating with the body through the port 15. Tubular lugs 19 on the cover cooperate with lugs 20 on the body to receive bolts 21 for securing the cover to the body.

Extending oppositely laterally from the body at the upper end thereof, are flanges 22 forming with the upper end edge of the body an elongated horizontal seat or surface 23 to receive the lower edges of the vertical side walls 24 and end walls 25 of the chamber 18, and form a smooth track for a valve 26 fitting snugly between the side walls 24 and operable longitudinally in the chamber by a stem 27 slidable in an opening 28 in one of the end walls 25 to cover or uncover the port 15 for controlling the flow of steam from the inlet 17 to the engine. A packing box 29 in which the stem slides is provided at the opening to seal the chamber.

The chamber 18 is preferably rectangular in vertical cross section, and is elongated in the direction of movement of the stem 27, and the valve comprises a block rectangular in cross section to fit snugly in the chamber, the valve stem 27 having a reduced portion 30 extending through the valve, and screwthreaded at its outer end to receive nuts 31 for securing the valve to the stem.

Fixed to and extending laterally from the housing body beneath the stem 27 is a bracket 32 having an upturned arm 33 provided with a bearing opening 34 in which an internally spirally grooved bushing 35 is rotatably mounted to receive screwthreads 36 on the outer end portion of the stem 27.

A rod 37 provided with a squared head 38 is anchored in a squared socket 39 in a collar 40 threaded on the bushing, and keyed thereto by a set screw 41, whereby rotation of the rod will effect rotation of the bushing over the valve stem 27 to effect reciprocable movement of the stem.

The end of the collar and end flange 42 on the bushing, are spaced from opposite sides of the bearing member to receive bearings 43 and 44 comprising mated races and balls operating between the races for anchoring the bushing to the bearing member and reducing friction due to rotation of the bushing. A hand wheel 45 on the outer end of the operating rod 37 for rotating the rod and bushing represents the position of the operator, who thus has remote control over movement of steam into the engine.

In order to effect operation of the gear by steam under the control of the operator, a piston chamber member 46 having a chamber 47 is further formed on the outer wall of the body, and a piston 48 having a stem 49 connected with the gear lever operates in the chamber, steam being delivered from the chamber 18 through a body channel 50 formed in the thickened portion of the body produced by reducing the upper end of the bore, and having an inlet port 51 from the chamber 18 controlled by the valve 26 and an outlet port 52 into the chamber 47, delivery of steam being thus controlled by the engine-controlling valve 26 for actuating the piston to operate the gear lever in one direction.

The piston chamber member 46 preferably includes a tubular body portion integral with the body of the casing, and a cap 53 attached by bolts 54 on that end of the chamber which is presented toward the reversing lever and comprising an elongated tubular bearing member adapted to reciprocably support the stem 49. A yoke 55 on the outer end of the piston stem is pivotally connected to a link 56 pivotally mounted on a bracket 57 fixed to the reversing lever, whereby steam admitted to the piston chamber will move the piston in the direction of the lever to shift the lever and positively operate the reversing gear.

In order to effect automatic return of the reversing lever to normal position, one end of a coil spring 58 is attached to the bracket 57 and the other end anchored to one of the bolts which attaches the housing to the engine inlet.

The apparatus is adapted to effect operating action of the lever upon delivery of steam to the piston chamber to move the stem outwardly, and retain steam in the chamber for holding the lever in operating position.

In order to relieve the chamber of steam under pressure and permit the spring to return the reversing lever to normal position, the cylindrical chamber member is extended laterally beyond the body of the casing to form a projecting end 59, a valve housing 60 is screwthreaded thereinto, and a valve 61 adapted to seat on the inner end of the housing within the piston chamber has a stem 62 slidable in a spider-like bearing 63 in the housing.

The valve is adapted to be moved inwardly of the piston chamber to permit steam to escape therefrom, by a lever 64 pivotally mounted in a yoke-like depending portion 65 of a sleeve 66 supported by a bracket 67 fixed to a boss 68 on the piston chamber member 46 and having an upper end 69 engageable by a cam 70 at the outer end of a rod 71 slidable in the sleeve, the rod being responsive to movement of the stem 27 which moves the valve 26 into the position shown in Fig. 3 for opening the communication between the steam line and the engine, the inlet port to the piston chamber 47 being closed in this position of the valve.

This result is effected by connecting the opposite end of the rod pivotally to a bar 72 having a yoke 73 at one end secured by a bolt 74 to the valve stem 27, the opposite end of the bar being pivotally connected to a link 75 pivoted to a bracket 76 fixed to the piston chamber member.

An engine equipped as described, may be located adjacent a derrick or like apparatus provided with mechanism adapted to be operated by power supplied by the engine, the belt transmitting motion from the engine to the apparatus.

The valve operating rod will be provided of suitable length to locate the wheel thereof adjacent the position of the operator at the derrick, and a steam line will be connected to the inlet of the valve housing for delivering steam to actuate the engine and the gear-shifting mechanism.

The operator, manipulating the hand wheel, may effect rotation of the bushing in either direction to cause the block-like valve to move away from the rectangular central port in the valve chamber, and permit steam to enter the engine for operating the belt, for example locating the valve as shown in Fig. 3.

The direction in which the belt moves will depend upon the position of the reversing gear, as in ordinary apparatus of this character, the engine and belt moving in a so-called forward direction when the reversing lever is in retracted or normal position as illustrated in Fig. 1.

Should the operator wish to reverse the engine, he may manipulate the hand wheel to cause the valve to move to the left in Fig. 3, pass across the steam inlet port to the engine, and uncover the port and channel to the piston chamber. Steam under pressure will then pass into the piston chamber behind the piston, and move the piston outwardly to shift the gear lever and adjust the gear to reverse the direction of movement of the crank and belt.

The valve may be moved sufficiently into the left hand portion of the chamber in Fig. 3 to uncover both the port to the chamber and the port to the engine, whereby steam is admitted to the engine to actuate the same, and steam will be retained in the piston chamber, and hold the piston, thus retaining the reversing lever in operating position.

Restoration of the reversing gear to non-operative position, and actuation of the engine forwardly, are effected by manipulating the hand wheel to move the valve to the right. The initial movement locates the valve over the inlet port 15 to shut off flow of steam to the power cylinder of the engine and suspend actuation of the engine. Continued movement of the valve closes the port 51 to stop flow of steam to the piston chamber 47. Before the valve has reached a position whereby the port 15 is uncovered, the rod 71 has been moved by the stem sufficiently to cause the cam 70 to operate the lever 64 and shift the valve 61 in the end of the piston chamber. The chamber is thus relieved of steam pressure, and the spring 58 is permitted to return the reversing gear to normal position.

The movement of the valve is continued, to uncover the steam inlet port 15 and set up actuation of the engine in a forward direction.

Attention is called to the fact that the supply of steam to the engine is suspended, the retraction of the reversing lever is effected, and resumption of steam supply to the engine is brought about, by successive steps in the movement of the valve in one direction. Similarly, operation of the valve in the other direction from the retracted position shown in Fig. 3, first cuts off the steam supply to the engine, then uncovers the port 51 to the piston chamber, and effects closing of the valve in the end of the piston chamber to bring about actuation of the reversing gear, and then uncovers the inlet 15 to the engine to set up reverse actuation of the engine.

What we claim and desire to secure by Letters Patent is:

1. In combination with a steam engine and a reversing gear, a piston chamber, a piston in the chamber connected with the reversing gear, a housing having a steam inlet, an outlet to the steam engine, and a channel affording communication between the housing and the piston chamber, and a valve in the housing controlling flow of steam through the outlet or channel for selectively actuating either the steam engine or moving the piston to operate the reversing gear.

2. In combination with a steam engine and a reversing gear, a housing including a valve chamber having a steam inlet and a floor provided with an outlet to the steam engine and an auxiliary port, a piston chamber supported by the housing and communicating with the valve chamber through said port, a piston in the chamber connected with the reversing gear, a valve in the valve chamber movable on the floor thereof across said outlet and port for controlling flow of steam either to the steam engine or to the piston chamber, for selectively effecting or suspending actuation of the steam engine or actuating the piston to control the reversing gear.

3. In combination with a steam engine and reversing gear, a piston chamber, a spring-pressed valve normally closing one end of the piston chamber, a piston in said chamber connected with the reversing gear for moving the same in one direction when steam is admitted to the piston chamber, resilient means for moving the gear in the other direction, a valve chamber having a steam inlet and ports to the steam engine and the piston chamber, a control valve in the valve chamber movable in opposite directions to coincidently close one outlet and open the other, means including a stem on the control valve for operating the valve, and means connected with said stem operating upon movement of the control valve in one direction to shift the spring-pressed valve and relieve the piston chamber for permitting the resilient means to move the reversing gear.

4. In combination with a steam engine and reversing gear, a piston chamber, a spring-pressed valve normally closing one end of the chamber, a piston in said chamber, connected with the reversing gear for moving the same in one direction, resilient means for moving the gear in the other direction, a valve chamber having a steam inlet and outlets to the steam engine and the piston chamber, a control valve in the valve chamber controlling movement of steam through said outlets, and means connected with said control valve operating upon movement of the control valve to open the outlet to the steam engine for shifting the spring-pressed valve and relieving the piston chamber to permit the resilient means to move the reversing gear.

5. In combination with a steam engine and a reversing gear, a piston chamber, a piston in the chamber connected with the reversing gear, a housing having a steam inlet, an outlet to the steam engine, and a channel affording communication between the housing and the piston chamber, and a valve in the housing for opening or closing either the outlet or channel or both to admit or prevent flow of steam selectively or simultaneously to the steam engine and piston.

6. In combination with a steam engine and a reversing gear having a normally closed valve in one end, a piston in the chamber connected with the reversing gear, a housing having a steam inlet, an outlet to the steam engine, and a channel affording communication between the housing and the piston chamber, and a valve in the housing for opening or closing either the outlet or channel or both to admit or prevent flow of steam selectively or simultaneously to the steam engine and piston.

7. In combination with a steam engine and a reversing gear, a piston chamber having a normally closed valve in one end, a piston in the chamber connected with the reversing gear for moving the piston in one direction when steam is admitted to the piston chamber, resilient means for moving the gear in the opposite direction, a housing having a steam inlet, an outlet to the steam engine and a channel affording communication between the housing for opening or closing either the outlet or channel or both to admit or prevent flow of steam selectively or simultaneously to the steam engine and piston, means for reciprocating said valve, and means connected to said reciprocating means for opening said normally closed valve to relieve pressure from the piston chamber for permitting the resilient means to move the reversing gear.

In testimony whereof we affix our signatures.

HENRY H. BAILEY.
JACK LEE THOMAS.